United States Patent
Gray et al.

(10) Patent No.: US 11,757,659 B2
(45) Date of Patent: Sep. 12, 2023

(54) POST-QUANTUM CERTIFICATE BINDING

(71) Applicant: International Business Machines Corporation, Armonk, NY (US)

(72) Inventors: Michael W. Gray, Guanaba (AU); Narayana Aditya Madineni, Southport (AU); Simon D. McMahon, Gold Coast (AU); Matthew Green, Ashmore (AU); Peter T. Waltenberg, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 17/108,236

(22) Filed: Dec. 1, 2020

(65) Prior Publication Data

US 2022/0173915 A1 Jun. 2, 2022

(51) Int. Cl.
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/0852* (2013.01); *H04L 9/3247* (2013.01)

(58) Field of Classification Search
CPC ... H04L 9/3265; H04L 9/0825; H04L 9/0852; H04L 9/3247
See application file for complete search history.

(56) References Cited

U.S. PATENT DOCUMENTS

| 9,660,978 | B1 | 5/2017 | Truskovsky | |
|---|---|---|---|---|
| 9,667,619 | B1 | 5/2017 | Vera-Schockner | |
| 9,794,249 | B1 * | 10/2017 | Truskovsky | H04L 9/006 |
| 10,063,591 | B1 | 8/2018 | Jiang | |
| 10,298,404 | B1 | 5/2019 | Behm | |
| 10,425,401 | B1 | 9/2019 | Pecen | |
| 10,511,591 | B2 * | 12/2019 | Campagna | H04L 63/061 |

(Continued)

FOREIGN PATENT DOCUMENTS

| CN | 103314550 B | 10/2016 |
|---|---|---|
| CN | 114584290 A | 6/2022 |

(Continued)

OTHER PUBLICATIONS

Post Quantum Enabled Cyber Physical System, vol. 11 (Year: 2019).*

(Continued)

*Primary Examiner* — Alexander Lagor
*Assistant Examiner* — Lydia L Noel
(74) *Attorney, Agent, or Firm* — Kimberly S. Zillig (57) ABSTRACT

A method, a computer program product, and a system for binding post-quantum certificates to traditional certificates. The method includes selecting a traditional certificate in a certificate chain owned by an owner. The method also includes calculating a fingerprint of the traditional certificate. The method further includes generating a post-quantum certificate with identical information fields as the traditional certificate, and populating a serial number of the post-quantum certificate using the fingerprint. The post-quantum certificate acts as an extension of the first traditional certificate providing authentication and validation between a client and a server using post-quantum capable signing algorithms.

15 Claims, 7 Drawing Sheets

(56) References Cited

U.S. PATENT DOCUMENTS

| | | | |
|---|---|---|---|
| 10,630,655 | B2 | 4/2020 | Becker |
| 10,742,420 | B1 * | 8/2020 | Griffin ................. H04L 9/3093 |
| 2012/0011566 | A1 | 1/2012 | Youm |
| 2012/0173874 | A1 | 7/2012 | Brown |
| 2014/0095865 | A1 | 4/2014 | Yerra |
| 2017/0359185 | A1 | 12/2017 | Hang |
| 2019/0319804 | A1 | 10/2019 | Mathew |
| 2020/0028699 | A1 | 1/2020 | Sharifi Mehr |
| 2020/0082738 | A1 | 3/2020 | Poeppelmann |
| 2020/0196122 | A1 | 6/2020 | Junk |
| 2020/0259647 | A1 | 8/2020 | Goncalves |
| 2021/0377049 | A1 * | 12/2021 | Nix ....................... H04L 9/0852 |
| 2022/0052859 | A1 | 2/2022 | Marzorati |
| 2022/0075877 | A1 | 3/2022 | Helms |
| 2022/0141039 | A1 | 5/2022 | Gray |
| 2022/0173915 | A1 | 6/2022 | Gray |
| 2022/0248221 | A1 | 8/2022 | Nix |

FOREIGN PATENT DOCUMENTS

| | | | |
|---|---|---|---|
| DE | 102021129514 A | 6/2022 | |
| EP | 2068264 A2 | 6/2009 | |
| EP | 3432509 A1 | 1/2019 | |
| EP | 3361695 B1 | 3/2020 | |
| JP | 2022087841 A | 6/2022 | |
| WO | WO-2013173408 A1 * | 11/2013 | ............. G06K 19/10 |
| WO | 2020123959 A1 | 6/2020 | |
| WO | 2022090405 A1 | 5/2022 | |

OTHER PUBLICATIONS

Application No. GB2116490.0. Patents Act 1977: Combined Search and Examination Report under Sections 17 and 18(3). Apr. 26, 2022. 6 pgs.

Paul, S., Scheible, P. (2020). Towards Post-Quantum Security for Cyber-Physical Systems: Integrating PQC into Industrial M2M Communication. In: Chen, L., Li, N., Liang, K., Schneider, S. (eds) Computer Security—ESORICS 2020. ESORICS 2020. Lecture Notes in Computer Science(), vol. 12309. Springer, Cham. https://doi.org/10.1007/978-3-030-59013-0_15.

"Post-Quantum TLS", Microsoft, retrieved from the Internet on Aug. 31, 2020, 3 pages, <https://www.microsoft.com/en-us/research/project/post-quantum-tls/>.

Burstinghaus-Steinbach et al: "Post-Quantum TLS on Embedded Systems: Integrating and Evaluating Kyber and SPHINCS+ with mbed TLS", Oct. 5, 2020, 12 pps.

International Search Report and Written Opinion dated Jan. 28, 2022 from PCT Application No. PCT/EP2021/080014 filed Oct. 28, 2021, 11 pps.

Kampanakis et al., "The Viability of Post-Quantum X.509 Certificates", Published 2018, Computer Science, 21 pages, https://eprint.iacr.org/2018/063.pdf>.

List of IBM Patents or Patent Applications Treated as Related (signed 2022) 2 pages.

Mell et al., "The NIST Definition of Cloud Computing", Recommendations of the National Institute of Standards and Technology, Special Publication 800-145, Sep. 2011, 7 pages.

Sikeridis et al.,"Post-Quantum Authentication in TLS 1.3: A Performance Study", Network and Distributed Systems Security (NDSS) Symposium 2020, Feb. 23-26, 2020, San Diego, CA, USA, 16 pages, <https://dx.doi.org/10.14722/ndss.2020.24203>.

Tan et al., "A Survey of Digital Signing in the Post Quantum Era", Nov. 29, 2019, 30 pps.

Notice of References Cited for U.S. Appl. No. 17/086,510. dated Feb. 1, 2023 2pgs.

* cited by examiner

POST-QUANTUM CERTIFICATE BINDING

BACKGROUND

The present disclosure relates to post-quantum capable certificates, and more specifically, to binding post-quantum capable certificate chains to existing traditional certificate chains.

Digital certificates, or public key certificates, are electronic documents used to prove the ownership of a public key. The certificates include information about the key, the identity of its owner, and the digital signature of an entity that has verified the certificate's contents. If the digital signature is valid, and the software examining the certificate trusts the issuer, then the key provided by the digital certificate can be used to communicate securely with the owner of the certificate.

Post-quantum cryptography refers to cryptographic algorithms that are believed to be secure against attacks by a quantum computer. Current encryption techniques used by traditional public-key algorithms are considered vulnerable against sufficiently strong quantum computers. The vulnerability exists because quantum computers can inherently solve certain mathematical problems such as integer factorization, discrete logarithms, and elliptic-curve discrete logarithms. Current encryption techniques rely on these problems to ensure their algorithms are secure. As such, new algorithms are being designed to prevent potential attacks from quantum computers.

SUMMARY

Embodiments of the present disclosure include a computer-implemented method of binding post-quantum certificates to traditional certificates. The computer-implemented method includes selecting a traditional certificate in a certificate chain owned by an owner. The computer-implemented method also includes calculating a fingerprint of the traditional certificate. The computer-implemented method further includes generating a post-quantum certificate with identical information fields as the traditional certificate and populating a serial number of the post-quantum certificate using the fingerprint. The post-quantum certificate acts as an extension of the first traditional certificate providing authentication and validation between a client and a server using post-quantum capable signing algorithms.

Additional embodiments of the present disclosure include a computer program product of binding post-quantum certificates to traditional certificates, which can include computer-readable storage medium having program instructions embodied therewith, the program instruction executable by a processor to cause the processor to perform a method. The method includes selecting a traditional certificate in a certificate chain owned by an owner. The method also includes calculating a fingerprint of the traditional certificate. The method further includes generating a post-quantum certificate with identical information fields as the traditional certificate and populating a serial number of the post-quantum certificate using the fingerprint. The post-quantum certificate acts as an extension of the first traditional certificate providing authentication and validation between a client and a server using post-quantum capable signing algorithms.

Further embodiments are directed to a system of binding post-quantum certificates to traditional certificates and configured to perform the methods described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to post-quantum capable certificates, and more specifically, to binding post-quantum capable certificate chains to existing traditional certificate chains. While the present disclosure is not necessarily limited to such applications, various aspects of the disclosure may be appreciated through a discussion of various examples using this context.

A digital certificate is an electronic document that provides information proving an identity of an entity. The certificate binds the identity of the entity to a public key owned by the entity. A certificate can include standard information such as a name, a public key, a validity period, and a digital signature of a certification authority.

A certification authority can be a trusted third party that issues certificates to entities after verifying the entity's identity. Once verified, the certificate authority signs the certificate using its own private key, and the certificate is provided to the entity. Another entity can then validate the identity of a certificate owner by obtaining their digital certificate and verifying the signature using the certificate authority's public key.

Digital certificates are used by cryptographic technologies as a way to authenticate a source and protect the confidentiality and integrity of information communicated and stored. Cryptographic technologies include various protocols, schemes, and infrastructures that rely on a collection of cryptographic algorithms to maintain security. The cryptographic algorithms transform data, using a variable, or key, to encrypt and protect information typically in the form of symmetric and asymmetric algorithms.

In symmetric cryptographic algorithms, the same key is used by both the originator and recipient of encrypted information. A symmetric key remains a secret to maintain confidentiality as anyone with the key can recover the encrypted information. Asymmetric cryptographic algorithms require the originator to use one key and the recipient to use a different but related key. The private key remains secret, while the public key can be made public without degrading the security of the cryptographic process.

During the cryptographic process, digital certificates act as electronic credentials that bind the identity of the certificate owner to a pair of public and private keys that can be used to encrypt and sign information. Without a certificate, someone could encrypt data with a private key, and a corresponding public key could be used to decrypt the data. However, there would be no assurance that the data originated from a particular person. To ensure certificate authenticity, certificate authorities are used. Certificate authorities act as trusted third parties that issue digital certificates. Certificates from certificate authorities bind the identity of a certificate owner to a pair of encryption keys while also providing assurances to receiving parties of the authenticity of the certificate owner.

Limitations on issuing certificates remain, however, as certificate authorities need to re-issue certificates that are capable of post-quantum cryptography. The requirement of reissuance and replacement of existing traditional certificates can result in a high cost and disadvantage to users, which may delay and hinder the adoption of post-quantum cryptography. Additionally, certificate issuance for client/server applications should be performed with care so as to maintain a trust relationship between servers and clients.

Embodiments of the present disclosure may overcome the above and other problems by using a post-quantum certificate binding system. The post-quantum certificate binding system can create post-quantum cryptography capable certificates and bind those certificates to existing traditional certificates. In some embodiments, a digital fingerprint of the traditional certificate is used as the serial number of the corresponding post-quantum certificate to bind the certificates together. Once the binding process is complete, a certificate owner can initiate a post-quantum connection using the post-quantum certificate.

More specifically, the post-quantum certificate binding system generates corresponding post-quantum capable certificates that are bound to traditional certificates. The binding can occur using identical information fields and using the fingerprint of the traditional certificate as the serial number of the post-quantum certificate. The bound certificates can be used together to either provide traditional security techniques or post-quantum security techniques provided by the post-quantum certificate. The bound certificates work in parallel without having to modify or replace the traditional certificate.

Before a certificate can be trusted, applications/servers perform a validation check to ensure that certificates are valid and that they have a valid certification path. Embodiments of the present disclosure can provide validation of a post-quantum certificate by verifying multiple parts of the post-quantum certificate bound to the traditional certificate.

In some embodiments, the post-quantum certificate binding system applies a public key infrastructure (PKI) validation procedure to both the traditional certificate and the post-quantum certificate. If the validation procedure detects inconsistencies between the bound certificates, then the certificates can be considered invalid and disregarded. In some embodiments, the serial number of the post-quantum certificate is verified against the digital fingerprint of the traditional certificate. The digital fingerprint and the serial number must match in order for the certificates to be validated. In some embodiments, the information fields of the bound certificates are analyzed to determine that each field is identical. For example, the subject name, version, and unique subject identification should match in order to be validated.

In some embodiments, the post-quantum certificate binding system strengthens potentially vulnerable traditional certificates by binding a certificate to a vulnerable certificate. For example, a traditional certificate may contain a weak encryption algorithm that is susceptible to attack. The post-quantum certificate binding system can detect the vulnerability and generate a certificate with a strong encryption algorithm that acts as an extension of the vulnerable certificate. The generated certificate can act as a replacement certificate and provide authentication and validation between a client and a server using the strong encryption algorithm.

In some embodiments, multiple certificate chains of traditional certificates are bound to a post-quantum certificate chain. For example, two traditional certificate chains can contain certificates with identical information fields, but one chain uses Rivest-Shamir-Adleman (RSA) encryption techniques, and the other certificate chain uses elliptic-curve cryptography (ECC) encryption techniques. The post-quantum certificate binding system can generate a post-quantum certificate chain that is bound to both traditional chains instead of generating two separate post-quantum certificate chains. In some embodiments, the traditional certificates do not contain identical information fields. The information fields from both of the traditional certificates can be used to populate the information fields of the post-quantum certificate and can be delineated using a comma or some other indicator.

In some embodiments, the post-quantum certificate binding system binds multiple post-quantum certificates onto a certificate chain. The post-quantum certificate binding system can traverse the certificate chain and generate a corresponding post-quantum certificate to each traditional certificate in the certificate chain and bind them together. In some embodiments, the bound post-quantum certificate contains identical information fields of the corresponding traditional certificates while using the fingerprints of the traditional certificates as its serial number. In some embodiments, the fingerprints of the traditional certificates are stored in an extension field of the post-quantum certificate. Once generated, the post-quantum certificate is bound to its corresponding traditional certificate.

Figure 1:
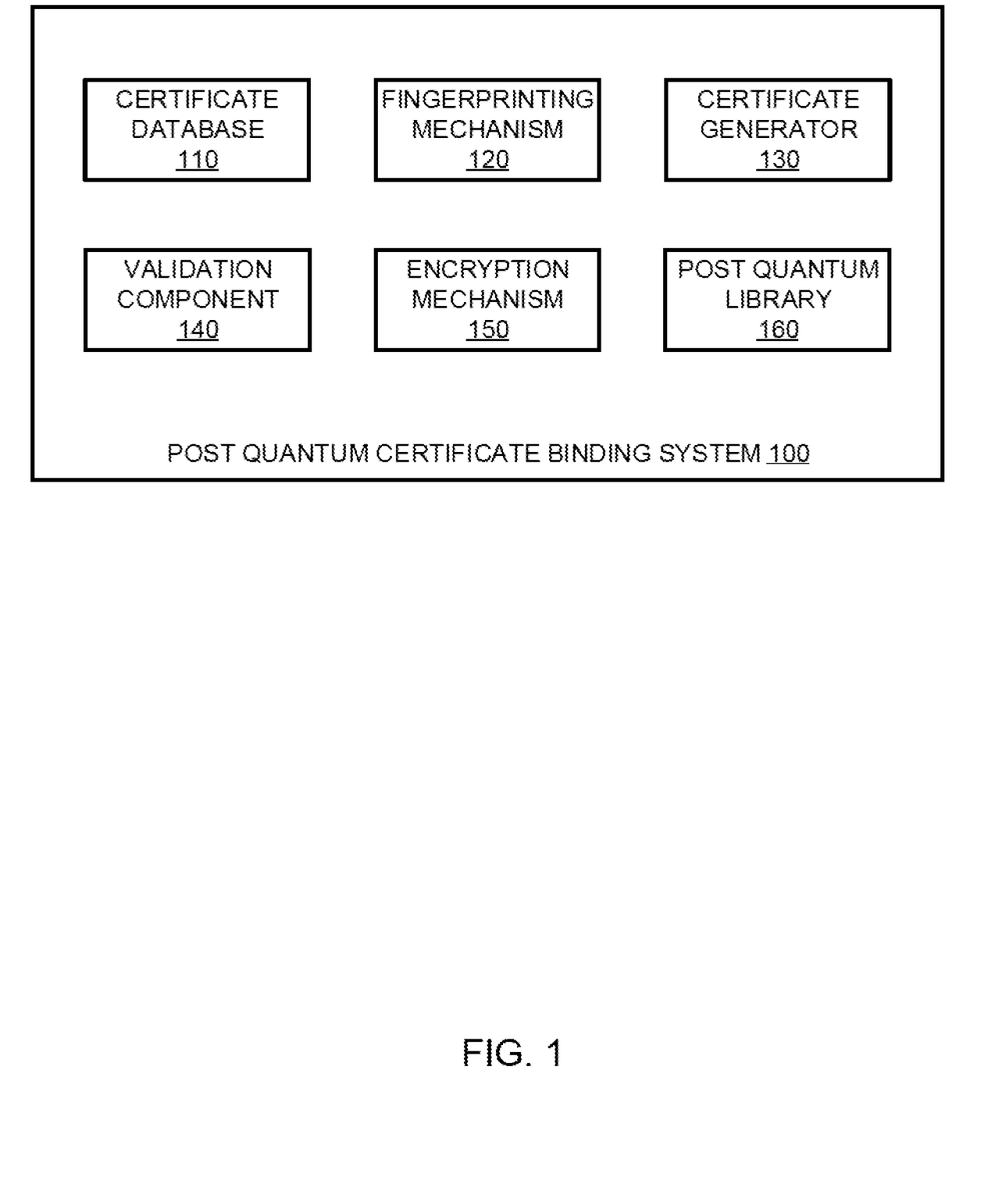
FIG. 1 is a block diagram illustrating a post-quantum certificate binding system, in accordance with embodiments of the present disclosure.

Referring now to FIG. 1, shown is a high-level block diagram of a post-quantum certificate binding system 100 for binding post-quantum certificates to traditional certificates. The post-quantum certificate binding system 100 includes a certificate database 110, a fingerprinting mechanism 120, a certificate generator 130, a validation component 140, an encryption mechanism 150, and a post-quantum algorithm library 160.

The certificate database 110 is a component of the post-quantum certificate binding system 100 configured to store digital certificates for binding. The certificate database 110 can store information collected, gathered, and generated by the post-quantum certificate binding system 100. In some embodiments, the stored information includes certificate chains with multiple interrelated certificates. For example, a certificate chain can include a root certificate, an intermediate certificate, and an end certificate. While shown in FIG. 1 as a database, the certificate database 110 can be a mapping, a table, journal, metadata, and the like.

A digital certificate, as used herein, is an electronic document that provides information proving an identity of an entity. A digital certificate contains a public key of the entity bound to the document. Digital certificates are typically structured using the X.509 standard. Within this standard are information fields that are either mandatory or optional. These information fields include, for example, a serial number, a signature algorithm, an issuer name, a validity period, a subject name, public key information, a version, an issuer unique identification, a unique subject identification, and extensions.

Regarding the information fields, the serial number can be represented as a unique positive number assigned to a certificate. The serial number is assigned by the issuer, or certificate authority, to identify the certificate. The signature algorithm field indicates the algorithm used by the issuer to sign the certificate. The issuer field indicates the X.500 distinguished name of the trusted third party who signed and issued the certificate. The validity field indicates the date from when the certificate is valid and the date until when the certificate is valid. The subject includes the distinguished name of the entity that owns the certificate. The owner can be the entity associated with the public key in the certificate. Owners include, for example, a certificate authority, registration authority, a person, a company, or an application. The public key information field contains the public key of the subject and the algorithm identifier. The issuer's unique identification field facilitates the reuse of the issuers' name over time. The extension fields are used to provide additional information about a certificate not provided in the other information field. The other information includes, for example, key usage, alternative subject name, basic constraints, alternative serial number (e.g., bound serial number), policy constraints, and the like.

A certificate can be issued for various purposes, which define the primary use of the certificate. These purposes include encryption, signature, signature and encryption, and signature and smartcard logon. A certificate with encryption purposes contains cryptographic keys for encryption and decryption. A certificate with a signature purpose contains keys for signing data only. The signature and encryption purpose covers all primary uses of a certificate's cryptographic key, including encryption of data, initial logon, or digitally signing data. Signature and smartcard logon purpose allows for initial logon with a smart card and digitally signing data.

Typically, a certificate authority generates a certificate in a standard format (e.g., X.509 certificate standard). The certificate contains the identity of the owner and its public key. The certificate is signed by the certificate authority with its own private key, and the certificate is issued to the owner. A certificate authority can be viewed as a root of trust in a public key infrastructure. When a hierarchical architecture of a certificate is followed, there is a root certificate authority with its own digital certificate, which is self-signed. The root certificate authority can create a certificate chain, or chain of trust, by signing certificates of the subordinate certificate authorities. This means that the certificate issued by a subordinate certificate authority (e.g., policy/intermediate certificate authority, end certificate authority) is considered trusted by the root certificate authority. Thus, a user or a web browser can trust a certificate issued by a subordinate certificate authority if it trusts the root certificate authority. A certificate chain can simplify key management and certificate monitoring by grouping certificate authorities into a tree-like structure, where verifying the root certificate automatically verifies the certificate chain.

The fingerprinting mechanism 120 is a component of the post-quantum certificate binding system 100 configured to apply a fingerprinting algorithm to characteristics of a certificate to generate a digital fingerprint of the certificate. Fingerprinting algorithms are procedures that map an arbitrarily large data item (e.g., certificate, file, document) to a shorter bit string. A digital fingerprint uniquely identifies the original data. A digital fingerprint can be used in the validation of the certificate. For example, a web browser can analyze the digital fingerprint against a previous digital fingerprint of a certificate to see if the certificate has been modified.

In some embodiments, the fingerprinting algorithm is a cryptographic hash function. The hash functions include, for example, message digest algorithm 5 (MD5) and secure hash algorithm (SHA256). The MD5 hash function produces a unique 128-bit value of data. This value can be displayed as 32 hexadecimal characters. The SHA256 hash function can produce a unique 160-bit value and can be displayed as 40 hexadecimal characters.

The certificate generator 130 is a component of the post-quantum certificate binding system 100 configured to create post-quantum certificates bound to traditional certificates. The certificate generator 130 can analyze a traditional certificate that uses traditional cryptographic techniques to generate a post-quantum capable certificate bound to the traditional certificate. The certificate generator 130 can pull the information fields (e.g., the version, validity period, subject, issuer) and populate the information fields in a post-quantum certificate with the same data. For example, if the version of the traditional certificate is X.509 version 3 then the post-quantum certificate will also contain X.509 version 3 in its version field.

The certificate generator 130 is further configured to populate the serial number field of a post-quantum certificate with a digital fingerprint of a traditional certificate the post-quantum certificate is binding to. For example, a post-quantum certificate is generated and is binding to a traditional certificate. The digital fingerprint of the traditional certificate generated by the fingerprinting mechanism 120 can be used as the serial number of the post-quantum certificate. In some embodiments, the certificate generator 130 places the digital fingerprint of the traditional certificate in an extension field of the post-quantum certificate. The digital fingerprint can act as a validation indicator of the binding between the traditional certificate and the post-quantum certificate.

The post-quantum certificate also performs the same purpose as the traditional certificate it is bound to. A certificate can be issued for various purposes, which define the primary use of the certificate. These purposes include encryption, signature, signature and encryption, and signature and smartcard logon. A certificate with encryption purposes contains cryptographic keys for encryption and decryption. A certificate with a signature purpose contains keys for signing data only. The signature and encryption purpose covers all primary uses of a certificate's cryptographic key, including encryption of data, initial logon, or digitally signing data. Signature and smartcard logon purpose allows for initial logon with a smart card and digitally signing data.

As such, if the traditional certificate has an encryption purpose, the bound post-quantum certificate will also have an encryption purpose. However, the post-quantum certificate will use a post-quantum resistant encryption method. In another example, if the traditional certificate has a signature and encryption purpose, then the post-quantum certificate will also have that purpose. However, the difference is that the post-quantum certificate can use post-quantum resistant encryption methods for both the encryption purpose and the signature purpose.

The certificate generator 130 is further configured to generate post-quantum certificates for traditional certificates in a certificate chain. Certificate authorities are often configured in a hierarchical structure. Typically, there are three types of hierarchies denoted by the number of tiers. For example, in a two-tier hierarchy, there is a root certificate authority that is generally offline and an issuing certificate authority. Tiered certificate authority hierarchy assists in providing an additional level of security as well as having certificate authorities in different geographical locations. The issuing certificate authority can be considered as a subordinate of the root certificate authority. An issued traditional certificate can be linked to other certificates via a certificate chain linking the certificate to the hierarchy a certificate authority uses. Based on the certificate chain, the certificate generator 130 can generate a corresponding number of post-quantum certificates for each traditional certificate in the certificate chain.

The certificate generator 130 is further configured to link post-quantum certificates to two separate traditional certificate chains. For example, two traditional certificate chains can contain certificates with identical information fields, but one chain uses RSA encryption techniques, and the other certificate chain uses ECC encryption techniques. The certificate generator 130 can generate a post-quantum certificate chain that is bound to both traditional chains instead of generating two separate post-quantum certificate chains. In some embodiments, the bound post-quantum certificate contains identical information fields of the corresponding traditional certificates while using both digital fingerprints of the traditional certificates as its serial number. In some embodiments, the fingerprints of the traditional certificates are stored in an extension field of the post-quantum certificate. Once generated, the post-quantum certificate is bound to both traditional certificate chains. In some embodiments, the traditional certificates from the certificate chains do not contain identical information fields. The information fields from both of the traditional certificates can be used to populate the information fields of the post-quantum certificate and can be delineated using a comma or some other indicator.

The certificate generator 130 is further configured to generate a digital certificate for a traditional certificate using a vulnerable encryption method. For example, a traditional certificate may use an encryption technique deemed susceptible to attack. The certificate generator 130 can generate a certificate using the binding techniques as stated above but using an encryption technique that is not vulnerable to attack. The replacement encryption technique can be a post-quantum resistant method or a traditional encryption method that is not considered vulnerable.

The validation component 140 is a component of the post-quantum certificate binding system 100 configured to validate bindings between post-quantum certificates and traditional certificates. Before a certificate can be trusted, the validation component 140 can perform a validation check to ensure that the post-quantum certificate is sufficiently bound to a traditional certificate. In some embodiments, the validation component 140 applies a PKI validation to the traditional certificate and post-quantum certificate to determine whether they are valid. A PKI validation can include a chain building process that checks the certificates along their certification path. If a problem exists along the certification path, or if the certificate cannot be found, the certificate is deemed invalid.

Additionally, the PKI validation can analyze whether a certificate's signature is valid, whether the start and expiration dates are properly configured, whether the certificate is expired, whether it has been revoked, and any other restriction that may exist on the certificate.

The validation component 140 is further configured to verify that the serial number of the post-quantum certificate matches the digital fingerprint of the bound traditional certificate. The validation component 140 can retrieve a digital fingerprint for the traditional certificate from the fingerprinting mechanism 120 and compare the serial number of the post-quantum certificate to the digital fingerprint. If the serial number and the digital fingerprint do not match, then the certificates are considered invalid. However, if the digital fingerprint and serial number match, then the certificates can be considered valid.

The validation component 140 is further configured to validate that the information fields in the post-quantum certificate match the information fields of the traditional certificate. The validation component can compare the various information fields such as the subject, issuer, and valid period and determine whether they match. If the information fields do not match, then the certificates are considered invalid. However, if the information fields do match, then the certificates can be considered valid.

The encryption mechanism 150 is a component of the post-quantum certificate binding system 100 configured to utilize one or more traditional or quantum-resistant public-key cryptographic methods for certificate encryption and signature purposes. The public-key cryptographic methods can specify one or more additional unclassified, publicly disclosed digital signatures, public-key encryption, and key-establishment algorithms. In some embodiments, the encryption mechanism 150 selects an algorithm from the algorithms listed in the post-quantum algorithm library 160 for the public key encryption and signature algorithm used to sign the certificate.

For example, the encryption mechanism 150 can utilize Cryptographic Suite for Algebraic Lattices (CRYSTALS) Kyber algorithm as the signature algorithm. Kyber is an IND-CCA2-secure key encapsulation mechanism (KEM), whose security is based on the hardness of solving learning-with-errors (LWE) problem over module lattices. The CRYSTALS Kyber algorithm is currently considered a post-quantum safe algorithm that can protect a post-quantum certificate from a potential quantum computational attack.

The post-quantum algorithm library 160 is a library of post-quantum algorithms the post-quantum certificate binding system 100 utilized by the encryption mechanism 150. The post-quantum algorithms include, for example, Big Quake, Bike, CFPKM, Classic McEliece, CRYSTALS-Kyber, DAGS, DualModeMS, EMBLEM, FALCON, HILAS, HQC, Lepton, Lizard, LOTUS, MQDSS, Picnic, Rainbow, Titanium, FrodoKEM, NewHope, and Three Bears. The post-quantum algorithms can additionally be divided into multiple categories. These categories include, for example, lattice-based cryptography, multivariate cryptography, hash-based cryptography, code-based cryptography, super-singular elliptic curve isogeny cryptography, and symmetric key quantum resistance.

It is noted that FIG. 1 is intended to depict the major representative components of an exemplary post-quantum certificate binding system 100. In some embodiments, however, individual components may have greater or lesser complexity than as represented in FIG. 1, components other than or in addition to those shown in FIG. 1 may be present, and the number, type, and configuration of such components may vary.

Figure 2:
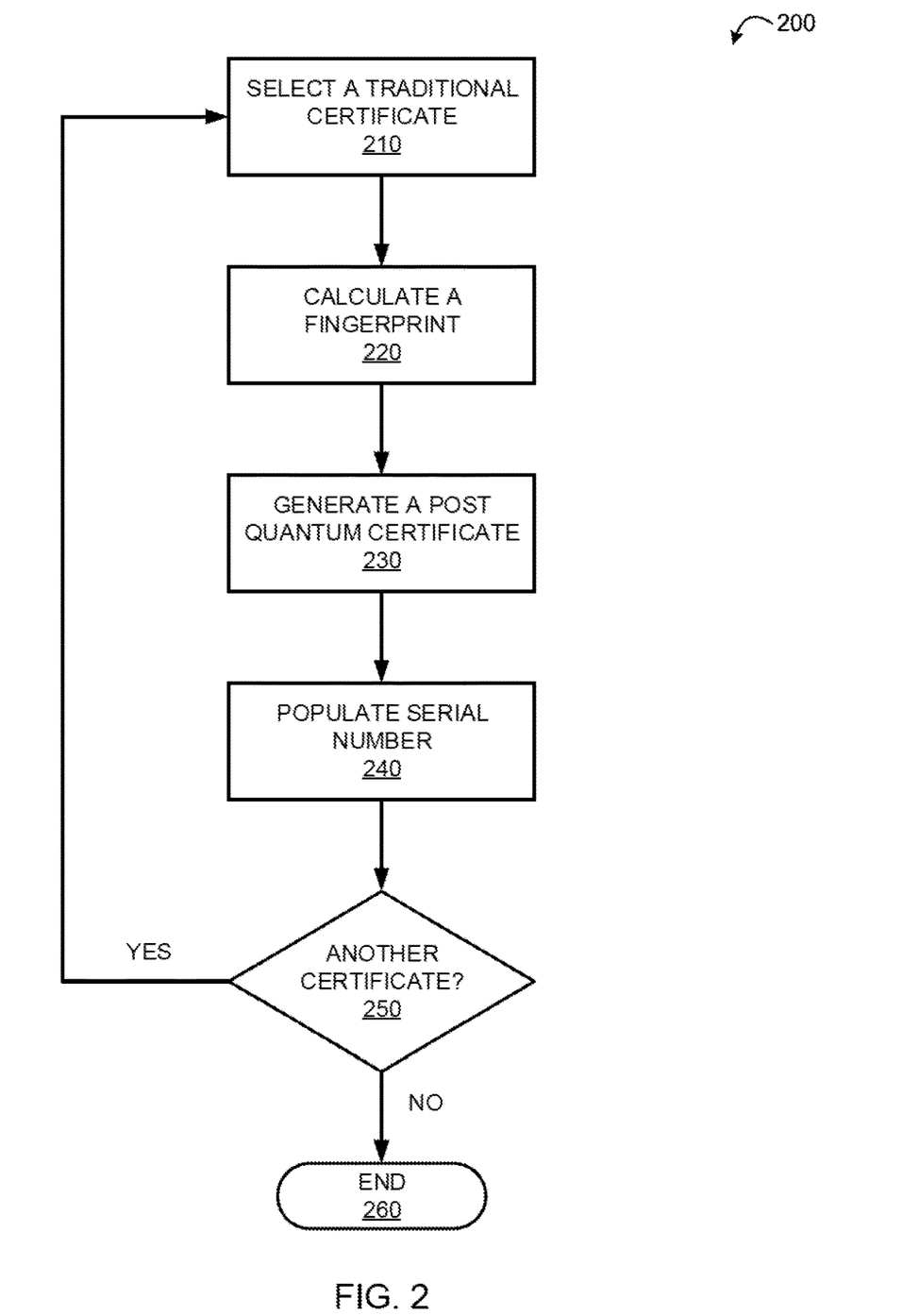
FIG. 2 is a flow diagram illustrating a process of binding a post-quantum certificate to a traditional certificate, in accordance with embodiments of the present disclosure.

FIG. 2 is a flow diagram illustrating a post-quantum certificate binding process 200 according to embodiments of the present disclosure. The process 200 may be performed by hardware, firmware, software executing on a processor, or a combination thereof. For example, any or all the steps of the process 200 may be performed by one or more processors embedded in a computing device. The process 200 begins by selecting a traditional certificate to bind. This is illustrated at step 210. The traditional certificate can be any traditional certificate along a certification chain or path. For example, the traditional certificate can be an end certificate of a three-tier hierarchy chain.

The fingerprinting mechanism 120 calculates a digital fingerprint of the selected traditional certificate. This is illustrated at step 220. In some embodiments, the fingerprinting mechanism 120 uses a cryptographic hash function to calculate the digital fingerprint. The hash function can be, for example, a SHA256 hash function. The digital fingerprint can then be used in the binding process as a serial number for the post-quantum certificate as well as a validation mechanism to ensure a proper binding between certificates.

The certificate generator 130 generates a post-quantum certificate to bind onto the traditional certificate. This is illustrated at step 230. The certificate generator 130 can pull the information fields (e.g., the version, validity period, subject, issuer) and populate the information fields in a post-quantum certificate with the same data. For example, if the version of the traditional certificate is X.509 version 3 then the post-quantum certificate will also contain X.509 version 3 in its version field. It should be noted that the generated post-quantum certificate also includes the same purpose as the traditional certificate it is bound to. These purposes include encryption, signature, signature and encryption, and signature and smartcard logon. For example, if the traditional certificate has an encryption purpose, the bound post-quantum certificate will also have an encryption purpose.

The certificate generator 130 populates the serial number field of the post-quantum certificate with a digital fingerprint of a traditional certificate the post-quantum certificate is binding to. This is illustrated at step 240. For example, a post-quantum certificate is generated and is binding to a traditional certificate. The digital fingerprint of the traditional certificate that is generated by the fingerprinting mechanism 120 can be used as the serial number of the post-quantum certificate. In some embodiments, the certificate generator 130 places the digital fingerprint of the traditional certificate in an extension field of the post-quantum certificate. The digital fingerprint can act as a validation indicator of the binding between the traditional certificate and the post-quantum certificate.

The post-quantum certificate binding system 100 checks to see if another traditional certificate requires binding. This is illustrated at step 250. The bound traditional certificate can be part of a certificate chain. If so, the post-quantum certificate binding system 100 can traverse up the certificate chain and return to step 210 to select the next traditional certificate within on the chain path. The process can continue until the certificate chain is completed. However, if there are no more traditional certificates to bind, then process 200 is complete. This is illustrated at step 260.

Figure 3:
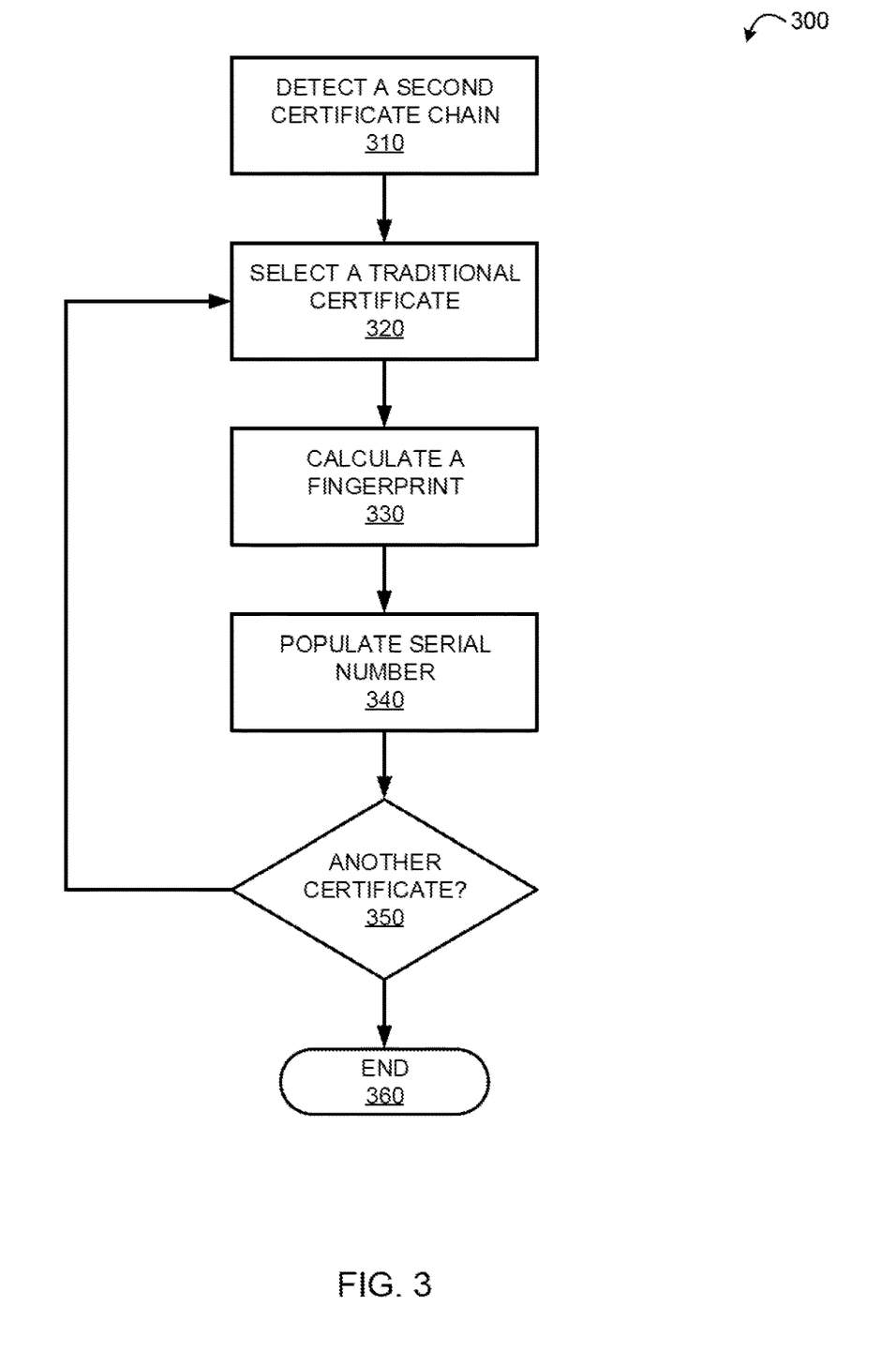
FIG. 3 is a flow diagram illustrating a process of binding a second certificate chain to a post-quantum certificate chain, in accordance with embodiments of the present disclosure.

FIG. 3 is a flow diagram illustrating a process 300 of binding a second certificate chain to a post-quantum certificate chain, according to embodiments of the present disclosure. The process 300 may be performed by hardware, firmware, software executing on a processor, or a combination thereof. For example, any or all the steps of the process 300 may be performed by one or more processors embedded in a computing device. The process 300 begins by detecting a second certificate chain compatible with a post-quantum certificate chain. For example, a post-quantum certificate chain can be produced as detailed by process 200 using a first traditional certificate chain. A second traditional certificate chain relating to the first traditional certificate chain can be detected by the post-quantum certificate binding system 100 that can also be bound to the same post-quantum certificate chain.

The post-quantum certificate binding system 100 selects a traditional certificate from the second traditional certificate chain to bind. This is illustrated at step 320. The traditional certificate can be an end point of the second traditional certificate chain or the root certificate. For example, the second traditional certificate chain can be a three-tier chain with an end certificate, an intermediate certificate, and a root certificate. Either the end or root certificate can be selected for binding.

The fingerprinting mechanism 120 calculates a digital fingerprint of the selected traditional certificate. This is illustrated at step 330. In some embodiments, the fingerprinting mechanism 120 uses a cryptographic hash function to calculate the digital fingerprint. The hash function can be, for example, a SHA256 hash function. The digital fingerprint can then be used in the binding process as a serial number for the post-quantum certificate as well as a validation mechanism to ensure a proper binding between certificates.

The certificate generator 130 populates the serial number field of the corresponding post-quantum certificate with a digital fingerprint of a traditional certificate. This is illustrated at step 340. The corresponding post-quantum certificate can be a post-quantum certificate with identical information field entries as the selected traditional certificate. For example, the post-quantum certificate can have the same subject, valid period, issuer, and subject as the traditional certificate. The digital fingerprint of the traditional certificate that is generated by the fingerprinting mechanism 120 can be used as an additional serial number of the post-quantum certificate. In some embodiments, the certificate generator 130 places the digital fingerprint of the traditional certificate in an extension field of the post-quantum certificate. The digital fingerprint can act as a validation indicator of the binding between the traditional certificate and the post-quantum certificate.

The post-quantum certificate binding system 100 checks to see if another traditional certificate requires binding in the second traditional certificate chain. This is illustrated at step 350. If another traditional certificate requires binding, then the post-quantum certificate binding system 100 can traverse up the certificate chain and return to step 320 to select the next traditional certificate within on the chain path. The process can continue until the certificate chain is completed.

However, if there are no more traditional certificates to bind, then process 300 is complete. This is illustrated at step 360.

Figure 4:
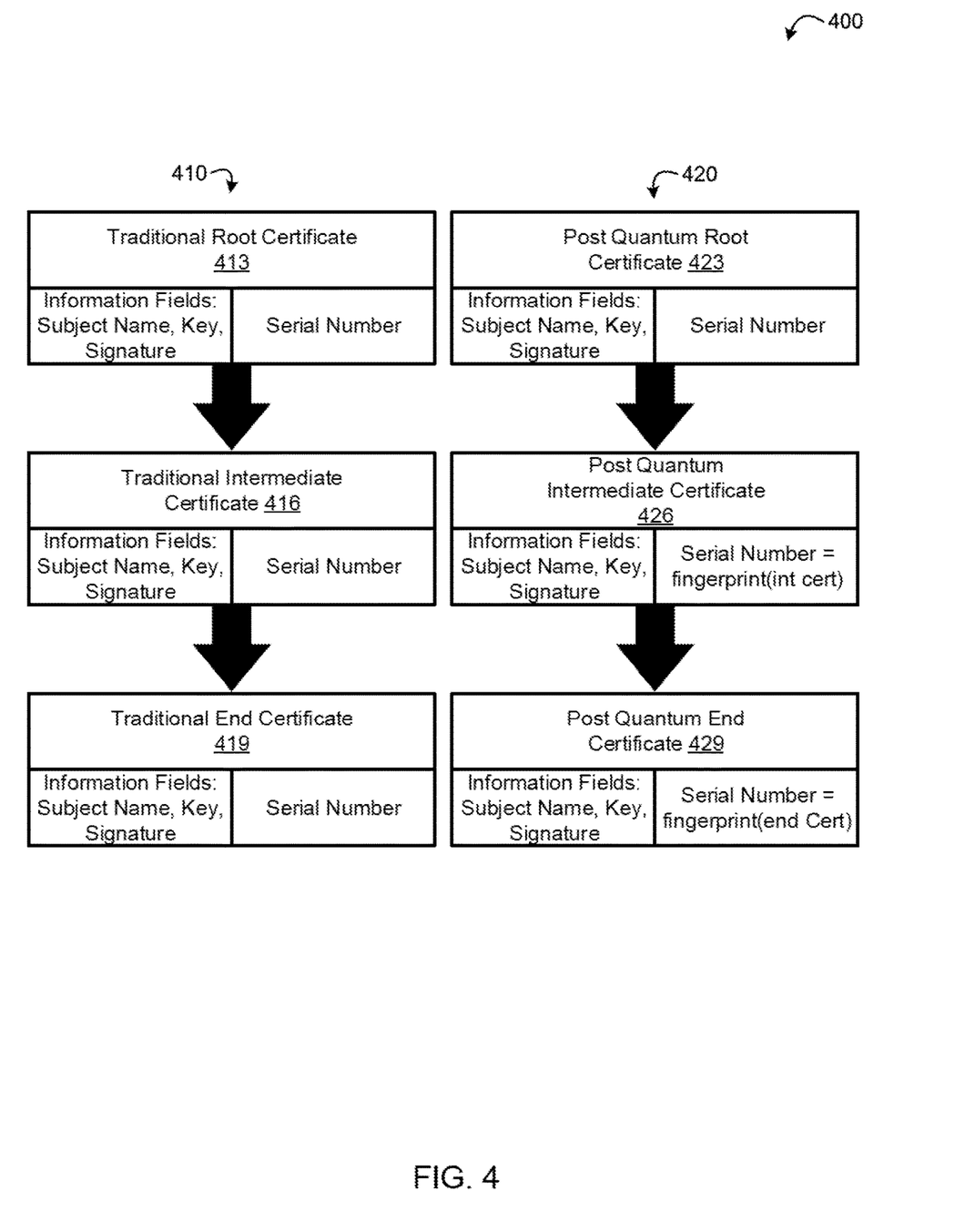
FIG. 4 is a block diagram illustrating a traditional certificate chain bound to post-quantum certificate chain, in accordance with embodiments of the present disclosure.

FIG. 4 is a block diagram 400 illustrating a traditional certificate chain with a corresponding bound post-quantum certificate chain, in accordance with embodiments of the present disclosure. The block diagram 400 includes a three-tier hierarchy traditional certificate chain 410 and a three-tier hierarchy post-quantum certificate chain. The three-tier traditional certificate 410 includes a traditional root certificate 413, a traditional intermediate certificate 416, and a traditional end certificate 419. The three-tier post-quantum certificate chain includes a post-quantum root certificate 423, a post-quantum intermediate certificate 426, and a post-quantum end certificate 429.

The traditional end certificate 419 and the post-quantum end certificate 429 are bound to each other as they include identical information fields such as the subject name, key, and signature. Additionally, the serial number of the post-quantum end certificate 429 is the digital fingerprint of the traditional end certificate 419. With the information fields being identical and the serial number being the digital fingerprint of the traditional end certificate 419, the post-quantum end certificate 429 can be validated as being bound to the traditional end certificate 419.

As with the end certificates 419 and 429, the traditional intermediate certificate 416 and the post-quantum intermediate certificate 426 are bound to each other as they include identical information fields such as the subject name, key, and signature. Additionally, the serial number of the post-quantum intermediate certificate 426 is the digital fingerprint of the traditional intermediate certificate 416. With the information fields being identical and the serial number being the digital fingerprint of the traditional intermediate certificate 416, the post-quantum intermediate certificate 426 can be validated as being bound to the traditional intermediate certificate 416.

Additionally, the traditional root certificate 413 and the post-quantum root certificate 423 are also bound to each other. The traditional intermediate certificate 416 and the post-quantum intermediate certificate 426 are bound to each other as they include identical information fields such as the subject name, key, and signature. However, as root certificates are inherently trusted, the post-quantum root certificate 423 need not necessarily use the digital fingerprint of the traditional root certificate 413. However, in some embodiments, the post-quantum root certificate 423 can use the digital fingerprint of the traditional root certificate 413 as its serial number.

Figure 5:
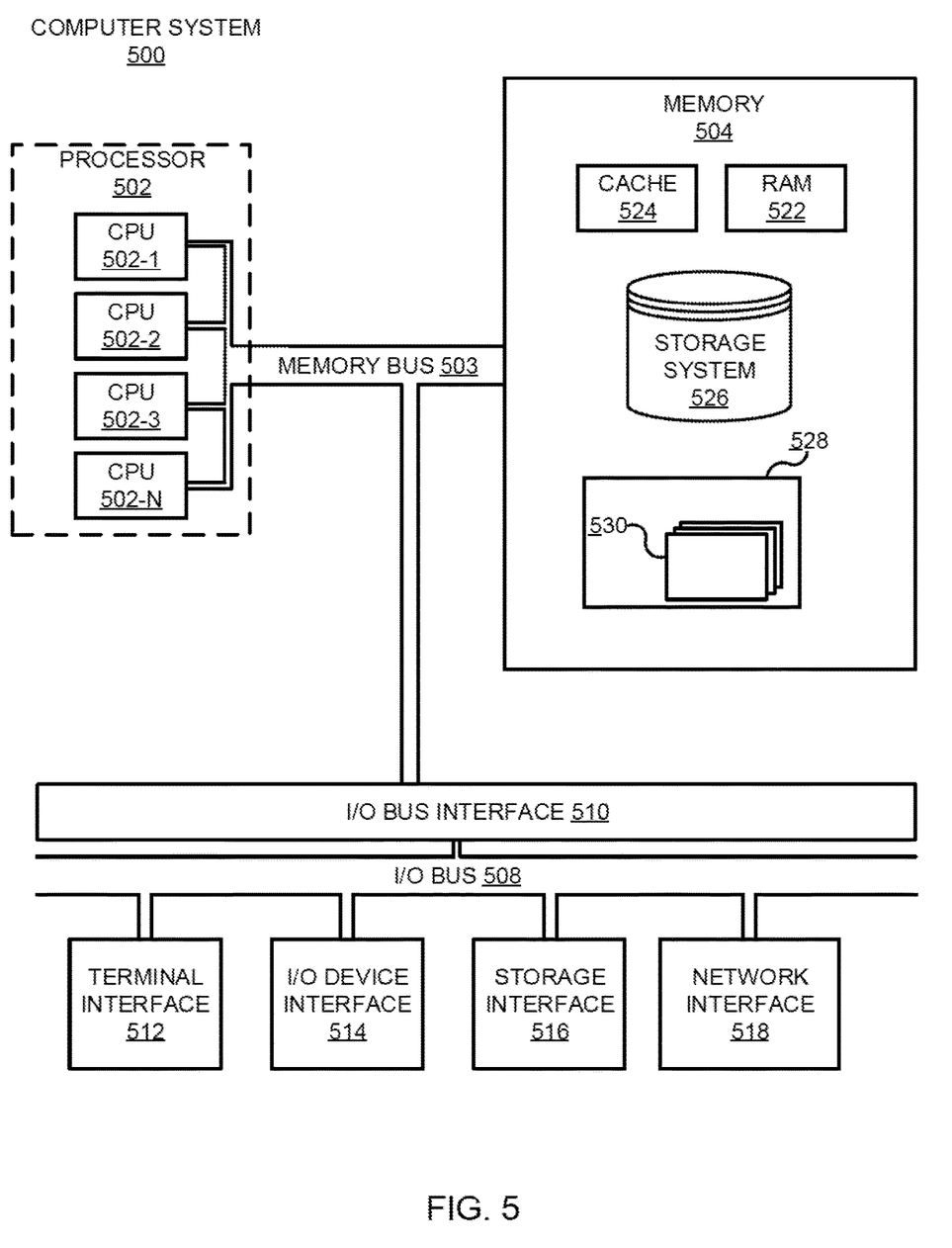
FIG. 5 is a high-level block diagram illustrating an example computer system that may be used in implementing one or more of the methods, tools, and modules, and any related functions, described herein, in accordance with embodiments of the present disclosure.

Referring now to FIG. 5, shown is a high-level block diagram of an example computer system 500 (e.g., the post-quantum certificate binding system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 502 may execute instructions stored in the memory 504 and may include one or more levels of onboard cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 (e.g., the post-quantum certificate binding system 100), may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
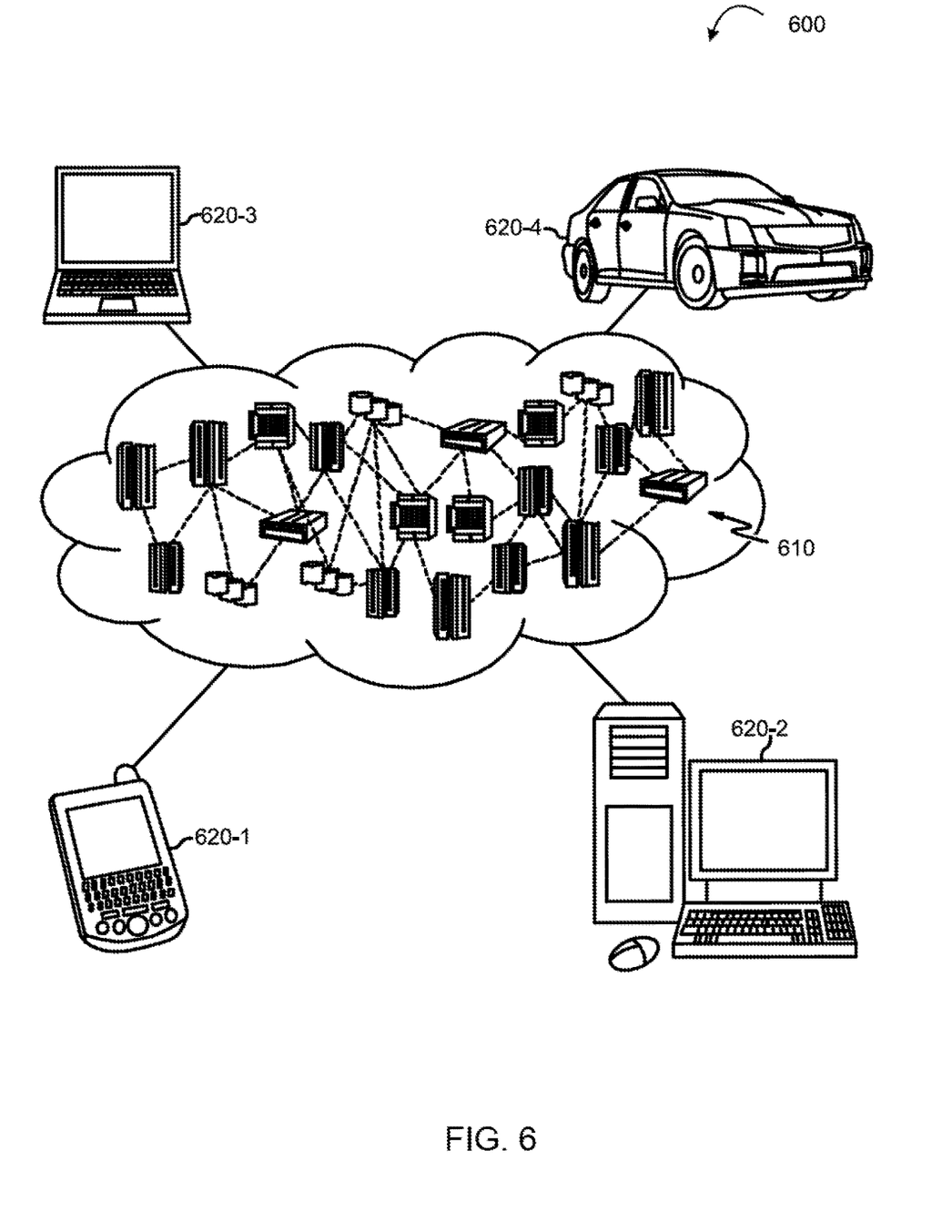
FIG. 6 depicts a cloud computing environment, in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (P.D.A.) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
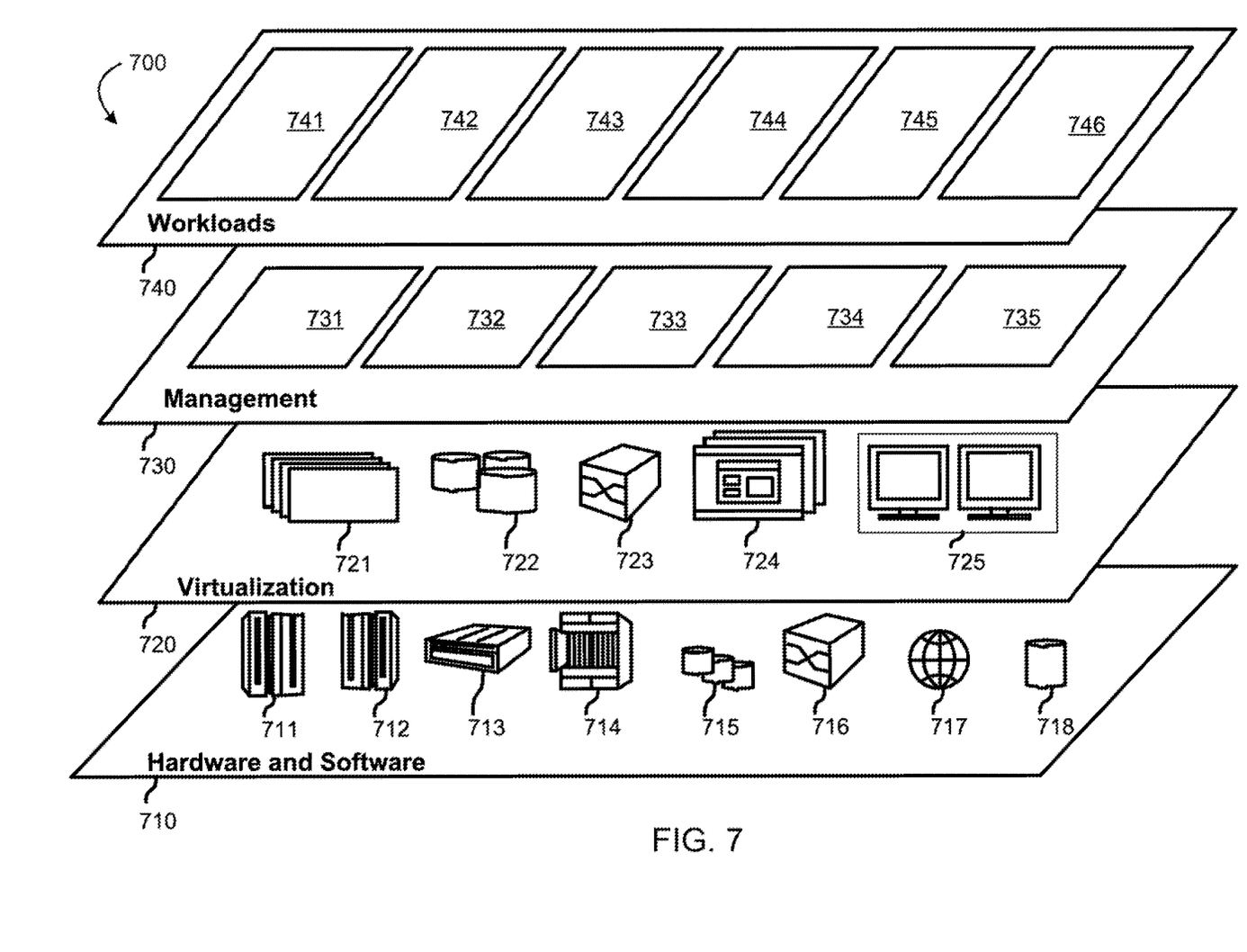
FIG. 7 depicts abstraction model layers, in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (S.L.A.) planning and fulfillment 735 provide pre-arrangement for, and procurement of, cloud computing resources for which a future requirement is anticipated in accordance with an S.L.A.

Workloads layer 740 provides examples of functionality for which the cloud computing environment may be utilized. Examples of workloads and functions which may be provided from this layer include mapping and navigation 741; software development and lifecycle management 742 (e.g., the post-quantum certificate binding system 100); virtual classroom education delivery 743; data analytics processing 744; transaction processing 745; and precision cohort analytics 746.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of binding post-quantum certificates to traditional certificates, the computer-implemented method comprising:
   selecting a first traditional certificate in a certificate chain owned by an owner;
   calculating a first digital fingerprint of the first traditional certificate using a cryptographic hash function on characteristics found within the first traditional certificate;
   generating a first post-quantum certificate with identical information fields as the first traditional certificate, wherein the first post-quantum certificate is bound to the first traditional certificate and performs a same purpose as the first traditional certificate;

populating a serial number field with a serial number of the first post-quantum certificate using the first digital fingerprint of the first traditional certificate to which the first post-quantum certificate is bound, wherein the first digital fingerprint is the serial number;

verifying the serial number of the first post-quantum certificate matches the first digital fingerprint of the first traditional certificate, wherein the first digital fingerprint acts as a validation indicator of binding between the first traditional certificate and the first post-quantum certificate;

detecting a vulnerable certificate in the certificate chain, wherein the vulnerable certificate contains an encryption algorithm susceptible to attack;

calculating a second digital fingerprint of the vulnerable certificate;

generating a second post-quantum certificate with identical information fields as the vulnerable certificate; and populating a second serial number of the second post-quantum certificate using the second digital fingerprint.

2. The computer-implemented method of claim 1, further comprising:

determining a second traditional certificate exists in the certificate chain;

selecting the second traditional certificate;

calculating a second digital fingerprint of the second traditional certificate;

generating a second post-quantum certificate with identical information fields as the second traditional certificate; and populating a second serial number of the second post-quantum certificate using the second digital fingerprint.

3. The computer-implemented method of claim 1, further comprising:

selecting a second traditional certificate chain owned by the owner;

selecting a second traditional certificate in the second traditional certificate chain;

calculating a second digital fingerprint of the second traditional certificate; and adding the second digital fingerprint to the serial number of the first post-quantum certificate.

4. The computer-implemented method of claim 1, further comprising:

applying a public key infrastructure (PKI) validation to the first traditional certificate and the first post-quantum certificate; and validating the information fields match between the first traditional certificate and the first post-quantum certificate.

5. The computer-implemented method of claim 1, wherein the post-quantum certificate acts as an extension of the first traditional certificate providing authentication and validation between a client and a server.

6. The computer-implemented method of claim 1, wherein the post-quantum certificate uses a post-quantum capable algorithm for encryption and signature purposes.

7. The computer-implemented method of claim 1, wherein the first digital fingerprint is stored in an extension field of the post-quantum certificate.

8. A computer program product of binding post-quantum certificates to traditional certificates, the computer program product comprising:

one or more computer readable storage medium, and program instructions stored on the one or more computer readable storage media, the program instructions comprising:

program instructions to select a first traditional certificate in a certificate chain owned by an owner;

program instructions to calculate a first digital fingerprint of the first traditional certificate using a cryptographic hash function on characteristics found within the first traditional certificate;

program instructions to generate a first post-quantum certificate with identical information fields as the first traditional certificate, wherein the first post-quantum certificate is bound to the first traditional certificate and performs a same purpose as the first traditional certificate;

program instructions to populate a serial number field with a serial number of the first post-quantum certificate using the first digital fingerprint of the first traditional certificate to which the first post-quantum certificate is bound, wherein the first digital fingerprint is the serial number;

program instructions to verify the serial number of the first post-quantum certificate matches the first digital fingerprint of the first traditional certificate, wherein the first digital fingerprint acts as a validation indicator of binding between the first traditional certificate and the first post-quantum certificate;

program instructions to detect a vulnerable certificate in the certificate chain, wherein the vulnerable certificate contains an encryption algorithm susceptible to attack;

program instructions to calculate a second digital fingerprint of the vulnerable certificate;

program instructions to generate a second post-quantum certificate with identical information fields as the vulnerable certificate; and program instructions to populate a second serial number of the second post-quantum certificate using the second digital fingerprint.

9. The computer program product of claim 8, further comprising:

program instructions to determine a second traditional certificate exists in the certificate chain;

program instructions to select the second traditional certificate;

program instructions to calculate a second digital fingerprint of the second traditional certificate;

program instructions to generate a second post-quantum certificate with identical information fields as the second traditional certificate; and program instructions to populate a second serial number of the second post-quantum certificate using the second fingerprint.

10. The computer program product of claim 8, further comprising:

program instructions to select a second traditional certificate chain owned by the owner;

program instructions to select a second traditional certificate in the second traditional certificate chain;

program instructions to calculate a second digital fingerprint of the second traditional certificate; and program instructions to add the second digital fingerprint to the serial number of the first post-quantum certificate.

11. The computer program product of claim 8, further comprising:

program instructions to apply a public key infrastructure (PKI) validation to the first traditional certificate and the first post-quantum certificate; and program instructions to validate the information fields match between the first traditional certificate and the first post-quantum certificate.

12. The computer program product of claim 8, wherein the post-quantum certificate acts as an extension of the first traditional certificate providing authentication and validation between a client and a server.

13. The computer program product of claim 8, wherein the post-quantum certificate uses a post-quantum capable algorithm for encryption and signature purposes.

14. The computer program product of claim 8, wherein the first digital fingerprint is stored in an extension field of the post-quantum certificate.

15. A system for binding post-quantum certificates to traditional certificates, the system comprising:

a memory;

a processor;

local data storage having stored thereon computer executable code;

a fingerprinting mechanism used to calculate a digital fingerprint of a traditional certificate using a cryptographic hash function on characteristics found within the traditional certificate;

a first certificate generator used to generate a post-quantum certificate using a quantum resistant algorithm for encryption, wherein the post-quantum certificate is bound to the traditional certificate by using the digital fingerprint as a serial number and performs a same purpose as the traditional certificate;

a validation component used to validate a binding between the post-quantum certificate and the traditional certificate by verifying the serial number of the post-quantum certificate matches the digital fingerprint of the traditional certificate, wherein the digital fingerprint acts as a validation indicator of the binding between the traditional certificate and the post-quantum certificate;

a verification component used to verify the serial number of the first post-quantum certificate matches the first digital fingerprint of the first traditional certificate, wherein the first digital fingerprint acts as a validation indicator of binding between the first traditional certificate and the first post-quantum certificate;

a detection component used to detect a vulnerable certificate in the certificate chain, wherein the vulnerable certificate contains an encryption algorithm susceptible to attack;

a calculation component used to calculate a second digital fingerprint of the vulnerable certificate;

a second certificate generator component used to generate a second post-quantum certificate with identical information fields as the vulnerable certificate; and a population component used to populate a second serial number of the second post-quantum certificate using the second digital fingerprint.

* * * * *